United States Patent
Sumida

[11] 3,797,602
[45] Mar. 19, 1974

[54] VEHICLE GUIDANCE SYSTEM
[76] Inventor: Harry H. Sumida, 10717 Antelope Dr., Lemoore, Calif. 93245
[22] Filed: July 13, 1972
[21] Appl. No.: 271,417

[52] U.S. Cl. ............................ 180/79.1, 180/51
[51] Int. Cl. ........................................ B62d 61/00
[58] Field of Search ........... 180/79.1, 51; 104/244.1

[56] References Cited
UNITED STATES PATENTS

| | | | |
|---|---|---|---|
| 2,496,727 | 2/1950 | Jenkins | 180/79.1 |
| 2,791,167 | 5/1957 | Lockmiller | 180/79.1 X |
| 2,674,332 | 4/1954 | Ovshinsky | 180/79.1 |
| 3,481,418 | 12/1969 | Wallan | 180/51 X |
| 2,509,914 | 5/1950 | Goodwine, Jr. | 180/79.1 |

Primary Examiner—M. Henson Wood, Jr.
Assistant Examiner—Michael Y. Mar
Attorney, Agent, or Firm—Cahill, Sutton & Thomas

[57] ABSTRACT

Apparatus is provided for automatically guiding a vehicle along a predetermined path in response to steer right, steer left, and steer without change signals obtained from trailing wheel apparatus following a precut trench. The trailing wheel is supported by a carriage assembly which is horizontally doubly-articulated and also pivotally connected to the vehicle for vertical travel. The carriage assembly includes a pair of limit switches and a vertically oriented pin normally positioned between the feeler arms thereof. Should the vehicle deviate sufficiently to one side of the predetermined path fixed by the precut trench, the carriage assembly shifts in such a manner that the pin touches one of the switch feeler arms to actuate the corresponding switch. An electrical signal developed therefrom institutes motor driven corrective action to the vehicle steering system, which corrective action is released once the pin is again oriented between the pair of feeler arms and touching neither. In the exemplary embodiment, the system is utilized to guide a farm tractor which may be provided with means to automatically cut guide trenches for a succeeding pass within an area where earth is being worked.

3 Claims, 5 Drawing Figures

VEHICLE GUIDANCE SYSTEM

This invention relates to the vehicle guidance arts, and, more particularly, to apparatus for guiding a vehicle in accordance with the relative position of the vehicle with respect to a prepositioned guide means such as a precut trench.

Systems for remotely guiding vehicles under the direct supervision of an operator or in accordance with some guide means which automatically describes a path which the vehicle is to follow have been successfully employed for many years. Such systems have included ratio coupled remote control units utilizing sophisticated servo means to insure proper operation. Similar systems electronically sense previously implanted guide means in conjunction with sophisticated steering means to following a predetermined path. Less sophisticated systems, still basically electronic, use a simplified steering system having only steer right, steer left, and no steering correction facility. The latter systems are used for less critical applications such as for slow moving vehicles, but they are of necessity complicated to the operator who might realistically be expected to use such apparatus, and a break down requiring repair becomes very serious if it should take place at a critical time. Additionally, experiences show that extraordinary measures must be taken to render such electronic equipment reliable in heavy duty use with consequent expense. Thus, it will be apparent to those skilled in the art that it would be highly desirable to provide a vehicle guidance system which is accurate, very rugged, simple and basically mechanical in nature to circumvent the economic, operation, and cost drawbacks associated with more complicated systems typical of the prior art.

It is therefore a broad object of my invention to provide an improved vehicle guidance system.

It is another object of my invention to provide such a system which is simple, rugged, and reliable.

It is yet another object of my invention to provide such apparatus in which the necessity for electronic circuits is obviated.

It is a more specific object of my invention to provide a vehicle guidance system including trailing wheel sensing means for following a guide trench.

It is a still more specific object of my invention to provide such a system in which the trailing wheel sensing means includes a compound articulated carriage assembly carrying a pair of limit switches for sensing, digitally, deviation from the prescribed path.

In another aspect, it is an ancillary object of my invention to provide means within the system for preparing a guide path for a succeeding pass of the vehicle as the vehicle follows the currently prescribed path.

The subject matter of the invention is particularly pointed out and distinctly claimed in the concluding portion of the specification. The invention, however, both as to organization and method of operation, may best be understood by reference to the following description taken in connection with the accompanying drawing of which:

Figure 1:
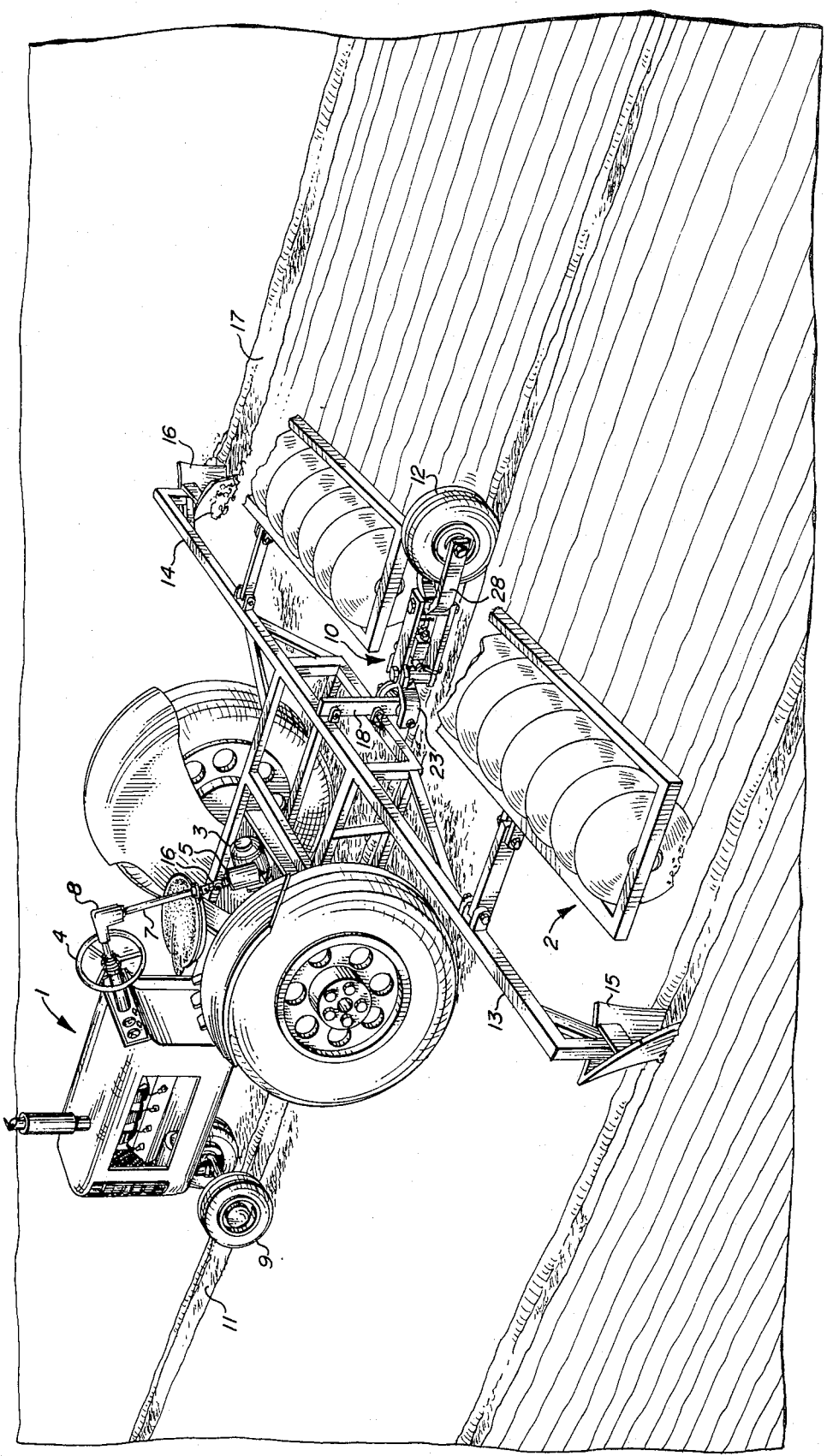
FIG. 1 is a perspective view illustrating an exemplary utilization of the apparatus of my invention to guide a tractor.

Attention is now directed to FIG. 1 which, it will be understood, is merely exemplary to illustrate the broad concepts of the invention. Those skilled in the art will understand, as the description of the invention proceeds, that the positions of the various elements of the system may be adjusted according to the specific construction of the vehicle and the appliances used therewith. A conventional tractor 1 pulling earth working appliances such as the disc 2 is steered by a reversible motor 3 which is coupled to the steering wheel 4 through a worm and follower speed reducer 5, universal joint 6, shaft 7, and right angle drive 8.

The reversible motor 3, through the conventional linkage between the steering wheel 4 and the front wheels 9 of the tractor 1, steers right, steers left, or steers without change according to the orientation of compound articulated carriage assembly 10 with respect to the tractor 1 and to a precut guide trench 11. A trailing wheel 12 fixed to the after end of the carriage 10 rides in the guide trench 11 to provide information representing the position of the tractor 1 with respect to the guide trench 11 in a manner which will become apparent below.

Outwardly directed frame members 13 and 14 carry at their outer ends, respectively, trench cutting means 15 and 16 which function to cut guide trenches, such as the new trench 17 for receiving the trailing wheel 12 on successive passes of the tractor 1 across the area to be worked. The distance between the center line of the tractor 1 and the trench cutting means 15 and 16 may adjust according to the effective width of the specific earth working apparatus such as a disc 2, utilized for a given earth working operation. Similarly, it will be understood that the central trailing position of the carriage 10 is merely exemplary and, if the carriage 10 should be offset to one side or another, appropriate and obvious adjustment to the lengths of the frame members 13 and 14 may be made.

Figure 2:
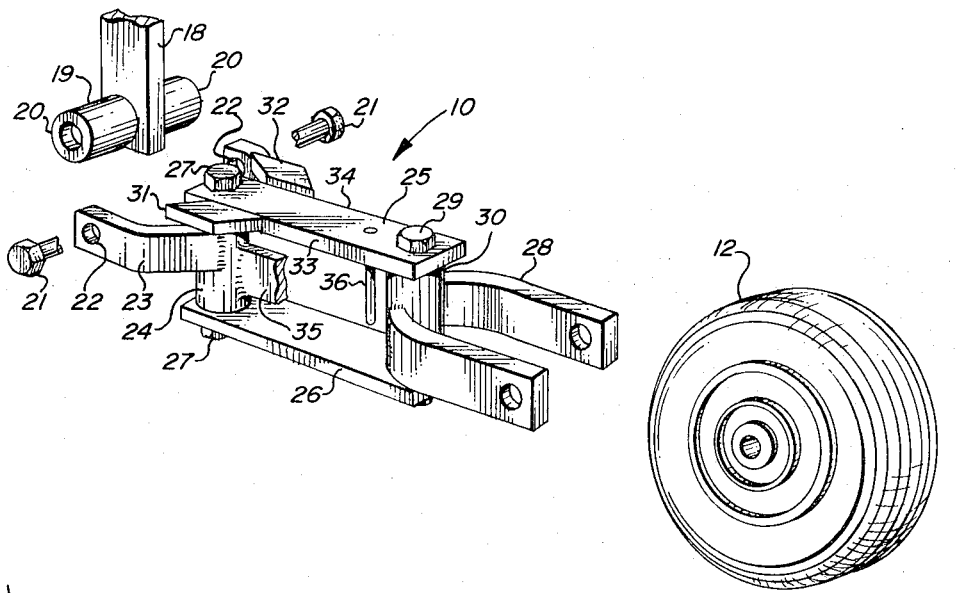
FIG. 2 is an exploded, partially cutaway view illustrating in more detail the carriage assembly for the systems trailing wheel.

Attention is now directed to FIG. 2 as well as FIG. 1 in order that the mechanical features of the carriage 10 may be more clearly perceived. A vertical forward support member 18 is rigidly fixed to the tractor 1 by any suitable means. Proximate the lower end of the support member 18 is a cylindrical housing 19 fitted with bushings 20 at each end thereof for receiving a bolt and nut assembly 21 which passes through apertures 22 in fork member 23 at the forward end of the carriage 10. Thus, the fork member 23, and hence the entire carriage 10, is pivotally fixed for rotation about the axis of the nut and bolt assembly 21. As a result, the trailing wheel 12 is free to following vertical undulations in the guide trench 11.

The fork member 23 includes a centrally disposed, vertically oriented cylinder portion 24 which is also fitted with bushings, similar to the bushings 20, but not shown, for fixing upper and lower horizontal frame members, 25 and 26 for horizontal articulation about the axis of nut and bolt assembly 27 which passes through aligned apertures in the frame members 25 and 26 and the bushings in the cylinder portion 24 of the fork member 23.

Similarly, proximate the rearward ends of the frame members 25 and 26, a rearwardly extending U-shaped member 28 is utilized to support the trailing wheel 12, and nut and bolt assembly 29 passes through intermediate cylindrical portion 30 of the U-shaped member 28 to provide another horizontally articulated joint in the carriage 10.

Stops 31 and 32 integral with the fork member 23 are positioned to abut the edges 33 and 34 of the upper frame member 25 to limit the degree of horizontal movement about the axis of the nut and bolt assembly 27. The necessity for providing such limiting will become apparent as the operation of the carriage 10 and its sensing apparatus is described further. It may be noted that a switch mounting bracket 35 extends rearwardly from the cylindrical portion 24 of the fork member 23. Switches mounted thereon, as will be discussed below, cooperate with a pin 36 extending downwardly from the upper frame member 25 just forward of the U-shaped member 28.

Figure 3:
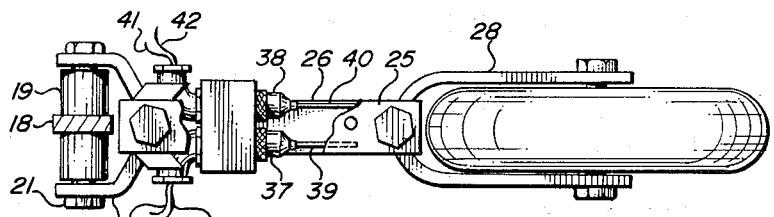
FIG. 3 is a partially cutaway top view of the carriage assembly illustrating the relative disposition of various functional components thereof.
Figure 4:
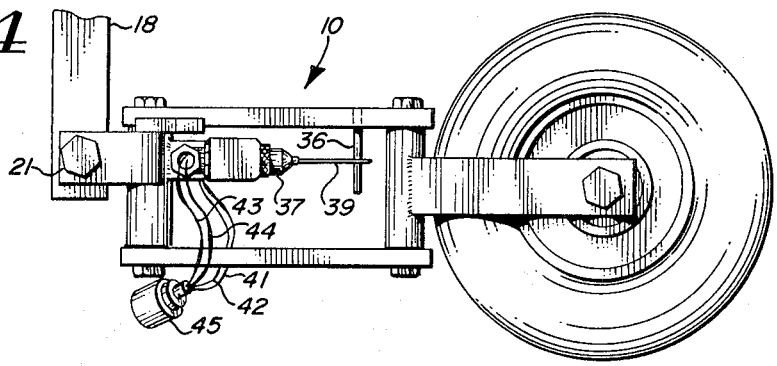
FIG. 4 is a side view of the carriage assembly further illustrating the relative disposition of the components.

As shown in FIGS. 3 and 4, first and second limit switches 37 and 38 are mounted on opposite sides of the switch mounting bracket 35. The switches 37 and 38 are each provided with rearwardly projecting actuating feelers 39 and 40 which terminate just rearward of the downwardly directed pin 36 which therefore normally is positioned between the feelers 39 and 40. However, as the carriage 10 pivots about the axis defined by the nut and bolt assembly 27, the pin 36 moves with respect to the feelers 39 and 40, toward one and away from the other, and if the movement is sufficient to bring the pin into contact with one of the feelers, the corresponding switch 37 or 38 is actuated. In order to prevent damage to the switches 37 and 38, the stops 31 and 32 limit the possible pivotal movement between the fork member 23 and the frame members 25 and 26 to an amount which just exceeds, in both directions, the amount of travel necessary to actuate the switches. Additionally, the feelers 39 and 40 are flexible to provide additional protection against damaging the switches 37 and 38 which are themselves quite rugged. By way of example, precision limit switches manufactured under the trademark "Microswitch" with a catalog listing 8LS125 has been found to be satisfactory for the intended purposes. Equivalent switches may, of course, be substituted.

The contacts of the switches 37 and 38 are normally open and therefore there is no continuity between the conductors 41 and 42 or between the conductors 43 or 44 as long as the pin 36 is positioned intermediate the feelers 39 and 40. However, when the switch 38 is actuated by physical contact between the pin 39 and 40 the normally open contacts are closed to electrically connect the conductors 41 and 42 directly. Similarly, physical contact between the pin 36 and the feeler 39 closes the contacts of the switch 37 to electrically connect the conductors 43 and 44. For convenience, the conductors 41, 42, 43, and 44 may be brought out to a coupling 45 to facilitate removal from the adjustment to the tractor of the carriage 10.

Figure 5:
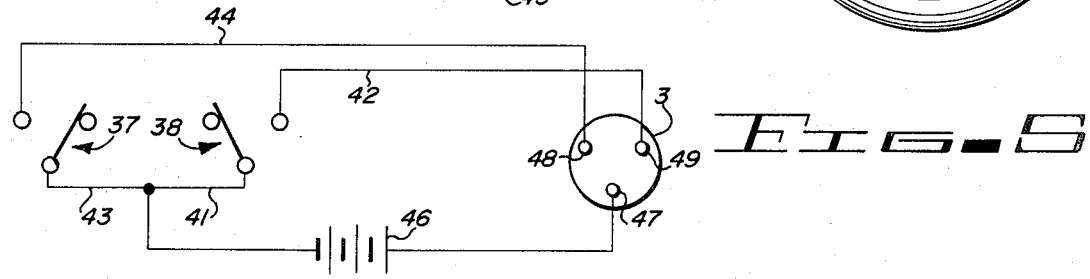
FIG. 5 is a schematic diagram of the electrical subsystem of my invention.

The operation of the system will be readily understood from a consideration of FIG. 5 in conjunction with the various mechanical and electrical elements already described. As shown in FIG. 5, conductors 41 and 43 are connected together and to one side of a battery 46 which may simply be the battery included in the electrical system of the tractor 1. The other side of the battery 46 is connected to a common terminal 47 of the reversing motor 3. Conductor 44 is connected to a second terminal 48 of the reversing motor 3, and conductor 42 is connected to a third terminal 49 of the motor. The characteristics of the reversing motor 3 are such that if the battery 46 is connected between the terminals 47 and 48, it rotates in a first direction, and if the battery 46 is connected between the terminals 47 and 49, the motor rotates in the opposite direction. If the contacts of the switches 37 and 38 as shown in FIG. 5, that is neither switch actuated, then the reversing motor 3 is not energized.

Assume now the condition generally depicted in FIG. 1 in which the tractor is closely following the guide trench 11. In that event, the trailing wheel 12, and hence the carriage 10 follows in rather close alignment to the path of the tractor, and the pin 36 remains between, but not touching the feelers 39 and 40 although there will naturally be a limited amount of movement. However, consider now the events which follow should the tractor tend to veer slightly to the right. The error in path will accumulate until the frame members 25 and 26 become sufficiently angled with respect to the guide path 11 that the switch 38 is actuated to energize the motor 3 by placing the battery 46 across the terminals 47 and 49. The motor 3 thereupon very slowly moves the steering wheel 4 counterclockwise, through the previously described linkage, until the pin 36 backs away from the feeler 40. The very gentle nature of the correction avoids radical over correction, and the tractor 1 continues along a new, slightly corrected path determined by the reset position of the steering wheel 4.

In the now obvious manner, if the tractor 1 tends to veer to the left, the switch 37 is actuated to throw the battery 46 across the terminals 47 and 48 to bring about corresponding corrective steering back to the right until the switch 37 is reopened when the pin 36 falls off the feeler 39.

By preparing an initial guide trench which includes appropriate turns according to the lay of the area to be worked, the tractor 1 will follow the desired pattern without manual supervision other than starting and stopping which can be carried out directly or by very simple radio control according to means already well known in the remote control arts. It may be emphasized, as previously noted, that the incorporation of the guidance system according to the present invention into any suitable vehicle is contemplated, and the description thereof in the environment of a farm tractor is exemplary of environments in which the invention has provided eminently functional and practical.

While the principles of the invention have now been made clear in an illustrative embodiment, there will be immediately obvious to those skilled in the art many modifications of structure, arrangement, proportions, the elements, materials, and components, used in the practice of the invention which are particularly adapted for specific environments and operating requirements without departing from those principles.

I claim:

1. An automatic system for guiding a vehicle in accordance with a precut trench, said system comprising:

a. steerable wheel means for determining the vehicle's direction of travel;
b. a reversible electric motor;
c. mechanical linkage means including speed reducing means for coupling said motor to said steerable wheel means;
d. trailing wheel means normally riding in the precut trench;
e. a carriage assembly fixed to the vehicle and supporting said trailing wheel at an aft end thereof, said carriage assembly comprising:
 1. first doubly articulated pivotal means for permitting said wheel to remain in said trench should the path of the vehicle veer from the path dictated by the precut trench, said first pivotal means including upper and lower frame members disposed intermediate forward and aft pivot members;
 2. second pivotal means for permitting vertical movement of said wheel with respect to said vehicle;
 3. first and second normally open switches fixed to said forward pivot member and having corresponding rearwardly directed first and second feelers; and
 4. a pin disposed between said first and second feelers for actuating said first switch and thus closing the contacts thereof if the vehicle veers beyond a predetermined angle in a first direction with respect to said guide trench and for actuating said second switch and thus closing the contacts thereof if the vehicle veers beyond a predetermined angle in a second direction with respect to said guide trench;
f. a source of electrical energy; and
g. a plurality of conductor means electrically coupling said source, said motor, and said switches whereby actuation of said first switch energizes said motor to move said wheel means such that the vehicle is steered in the second direction, said motor being de-energized when said first switch is no longer actuated, and whereby actuation of said motor to move said wheel means such that the vehicle is steered in the first direction, said motor being de-energized when said second switch is no longer actuated.

2. The system of claim 1 in which said pin depends from one of said frame members.

3. The system of claim 1 in which rotational movement about said first pivot member is limited in both directions by stop means.

* * * * *